United States Patent [19]

Cohen

[11] E Patent Number: Re. 31,872

[45] Reissued Date of Patent: Apr. 23, 1985

[54] ELECTRO-OPTICAL DISPLAY WITH CIRCUITRY FOR APPLYING PREDETERMINED POTENTIALS TO ALL DISPLAY SEGMENTS TO EFFECT ACTIVATION OF A SELECTED SEGMENT ONLY

[75] Inventor: Sam G. Cohen, Pleasantville, N.Y.

[73] Assignee: Timex Corporation, Waterbury, Conn.

[21] Appl. No.: 396,224

[22] Filed: Jul. 8, 1982

Related U.S. Patent Documents

Reissue of:

[64] Patent No.: 3,932,860
Issued: Jan. 13, 1976
Appl. No.: 463,927
Filed: Apr. 25, 1974

[51] Int. Cl.[3] ..... G09G 3/36; G06F 3/14

[52] U.S. Cl. ..... 340/784; 368/239; 368/242; 340/765; 340/754; 350/330

[58] Field of Search ..... 340/784, 805, 765, 753, 340/754; 350/330, 331, 332, 333; 368/239, 242

[56] References Cited

U.S. PATENT DOCUMENTS

| | | | |
|---|---|---|---|
| 3,376,452 | 4/1968 | Lally | 340/324 R |
| 3,712,046 | 1/1973 | Dill | 340/373 |
| 3,760,403 | 9/1973 | Kippenhan | 340/324 M |
| 3,776,615 | 12/1973 | Tsukamoto et al. | 340/805 |
| 3,781,587 | 12/1973 | Lustig et al. | 345/169 TV |
| 3,877,017 | 4/1975 | Kawakami et al. | 340/765 |
| 3,898,642 | 8/1975 | Dorey et al. | 340/784 |
| 3,934,241 | 1/1976 | Weigert | 340/811 |

*Primary Examiner*—Marshall M. Curtis
*Attorney, Agent, or Firm*—William C. Crutcher; Joseph A. Biela

[57] ABSTRACT

A horological instrument includes a liquid crystal electro-optical display which simulates the movement of hands about a center by activating circumferentially spaced radial conductive segments. Generally, for the liquid crystal material between two corresponding segments to be activated an electrical potential must be applied between the segments which is, typically to achieve full brightness, substantially greater than the activation voltage of the liquid crystal material. The present invention effects activation of a selected segment-hand by applying an electrical potential, predetermined greater than the activation voltage, between the selected segment-hand and a corresponding segment or electrode. However, the deleterious effects of leakage currents and/or unwanted activation of a segment-hand not selected for activation is reduced by applying an electrical potential between all unselected segment-hands and their corresponding segment or electrode, which electrical potential is predetermined to be less than the activation voltage of the liquid crystal material.

11 Claims, 7 Drawing Figures

ELECTRO-OPTICAL DISPLAY WITH CIRCUITRY FOR APPLYING PREDETERMINED POTENTIALS TO ALL DISPLAY SEGMENTS TO EFFECT ACTIVATION OF A SELECTED SEGMENT ONLY

Matter enclosed in heavy brackets [ ] appears in the original patent but forms no part of this reissue specification; matter printed in italics indicates the additions made by reissue.

BACKGROUND OF THE INVENTION

The present invention relates to horology and more particularly to an electro-optical device which displays the time.

At the present time, the most common types of watches are mechanical and electro-mechanical. The mechanical watches are powered by a spring which is either wound up by an external knob, or by the swinging of weights in an "automatic" watch. The spring operates a time standard, which is generally a balance wheel. The oscillatory motion of the balance wheel controls the rotary motion of a series of gears which rotate hands. The hands, usually a second hand, minutes hand and hour hand, move clockwise over the dial and beneath the protective transparent crystal to indicate time by means of cooperation with numerals or other markings on the face of the dial.

In the electro-mechanical watches the power source is an internal battery which powers a small motor, for example, a tuning fork type of motor or a balance wheel type of motor, which rotates the time display hands. Watches are also available in which the motor is synchronized by means of a quartz crystal oscillator circuit to obtain a higher accuracy.

Watches are also available, although at a relatively higher price, in which a quartz crystal oscillator is used as the time standard and the high frequency of the oscillator is reduced by means of a series of countdown circuits. The count-down circuits operate a display driver which is connected to an electro-optical display. The electro-optical display may be of the liquid crystal type in which segments are selectively activated by the display driver to form digital numbers. Although some consumers prefer a digital numerical type of display, many others, who are familiar with the rotation of hands, prefer to tell time by the position of two or three hands as they move clockwise in relationship to a dial, this latter type of display sometimes being called an "analog display".

One major problem which has been encountered in developing such an analog type of electro-optical time display has been that of leakage currents. Such leakage currents arise from the voltage applied to the activated segments. The leakage currents between the activated segments may be sufficient to activate other, i.e., unwanted, segments. This may give an incorrect time reading, may be annoying, and may waste power. The life of the battery cell and the liquid crystal material may be reduced because of such leakage currents.

Typical of the prior art are U.S. Pat. No. 3,776,615 to M. Tsukamoto which issued Dec. 4, 1973, and No. 3,789,388 to A. H. Medwin which issued Jan. 29, 1974.

It is an objective of the present invention to provide a liquid crystal electro-optical display for a horological movement in which the appearance will be similar to that of the movement of two or three hands, for example, the seconds, minutes and hour hands, as they rotate clockwise in relationship to a center, thereby simulating the appearance of hands in conventional mechanical watches.

It is a further objective of the present invention to provide such an electro-optical display that is relatively simple in construction, relatively low in initial cost, has little likelihood of failure in use, and which is accurate because only the desired segments are activated.

It is still a further objective of the present invention that such an electro-optical display use relatively little power, so that the life of the battery cell within the watch case may be prolonged.

SUMMARY OF THE INVENTION

In accordance with the present invention, an electro-optical display is provided which is, in effect, the crystal and dial of a horological instrument such as a watch. The electro-optical display shows time by a series of radial segments circularly arranged about a common center. For example, there may be 60 segments in an outer ring which indicates seconds and minutes and 24 segments in an inner ring to indicate hours. This selective activation of the segments of the liquid crystal display will simulate the clockwise rotaion of hands in a mechanical watch, to provide an analog type of display. The electro-optical dislay of the present invention is particularly suited for use in watches as its power consumption is relatively low and consequently the effective life of the battery cell within the watch case may be sufficient so that the cell need only be replaced once a year.

The liquid crystal display consists of a top transparent plate, such as glass crystal, having on its inner (bottom) face a pattern in a thin layer of a transparent conductive material, such as tin oxide. A bottom plate is spaced parallel to the top plate and is a non-conductive plate, for example of glass, having on its upper face a pattern in a thin layer of conductive material. A thin layer of liquid crystal material exhibiting dynamic scattering or field effect properties known in the art is placed between the plates. The edges of the plates are sealed to form a closed thin cell.

Generally, for the liquid crystal material between the segments to be activated, there must be a voltage, i.e., an electrical potential, applied between the top and the corresponding bottom conductive segments. Preferably the top conductive segments are relatively large and cover a number of the smaller bottom conductive segments, which bottom segments are connected in a number of string connections. These string connections provide a means whereby a mininum number of electrical connections can be made to the patterns on the glass plates to keep assembly costs at a minimum. However, these string connections also result in a condition that provides parallel electrical paths through the liquid crystal material and tends to activate undesired segments.

The driver display circuit of the present invention provides a means of preventing the undesired segments from reaching a threshold of activation.

A liquid crystal is selected with a fairly sharp threshold voltage $V_t$ between no reaction and activation. By applying twice the threshold voltage to a segment that is desired to be activated and applying a level of one third of this double threshold voltage to the unwanted segments in the prescribed manner herein described, the display operates as desired. For example, in particular, if a positive voltage (double threshold) $2V_t$ is applied to a selected string of conductive segments on the bottom glass plate, and ground (zero voltage) is applied to a selected large segment of the upper plate, the lower segment in the selected string, located under the selected upper segment will be activated. To prevent any other segments from being partially activated, all unused upper plate segments are returned to a voltage level $V_2$ of two-thirds of the supply voltage and all unused bottom plate strings are returned to a voltage level $V_1$ of one-third of the supply voltage. For the case where AC excitation is required, when the excitation to the desired segment is reversed then the $V_1$ and $V_2$ voltages on the bottom and top plate unused segments are also reversed.

BRIEF DESCRIPTION OF THE DRAWINGS

Other objectives of the present invention will be apparent from the following detailed description of the preferred embodiment of the present invention, the description being taken in conjunction with the accompanying drawings.

Figure 1:
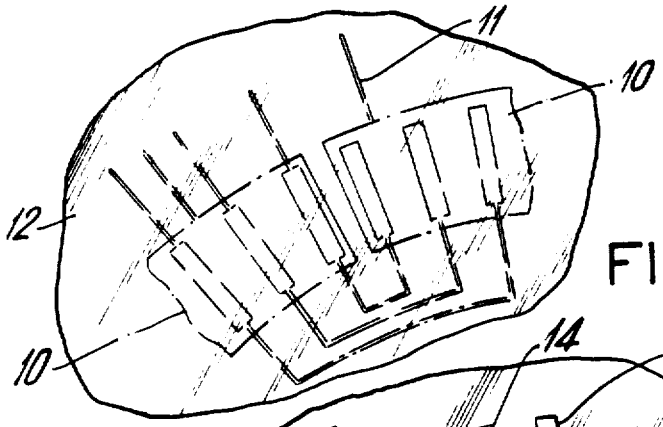
FIG. 1 is a top plan view of a portion of the top plate, i.e., the crystal of a watch.
Figure 2:
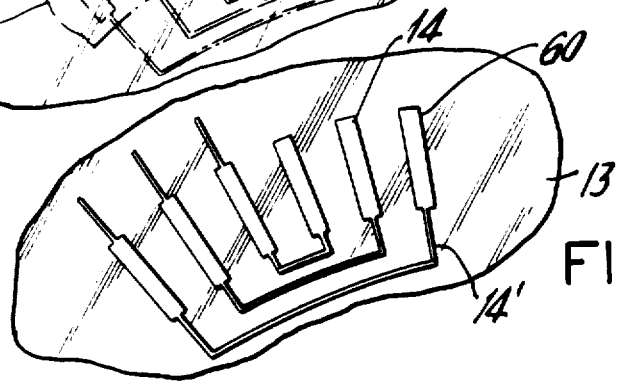
FIG. 2 is a top plan view of a portion of the bottom plate.

As shown by the drawings of FIGS. 1 and 2, the upper plate 12 which is the transparent crystal, has a number of segments 10, for example, eight, which are micron thin areas of vaccum-deposited indium oxide areas and their connecting lead strips 11, also of indium oxide are electrically conductive and yet sufficiently thin so that they are transparent. The glass back plate 13, has segments 14 of a thin layer of chrome, which is likewise electrically conductive, and connecting lines 14' of the same material.

The bottom plate 13 has 60 equidistant radial segments 14 representing minutes, which for purposes of description are numbered consecutively in the clockwise direction from 1 to 60. Segment 1 corresponds to the 12 o'clock position of the hands on a conventional watch.

Only segments 1 through 8 are brought out to corresponding input terminals by connecting lines. Segment 1 is also connected to one of the segments in the group numbered 9 through 16, said latter segment 16 in turn being connected to one of the segments in the group numbered 17 through 24, and so on. In this way a string of eight segments is being formed, each segment belonging to one and only one of the group 1 through 8, 9 through 16, . . . 56 through 60. Analogous strings of eight segments start respectively with segments 2, 3 and 4. Strings starting with segments 5, 6, 7 and 8 have only seven segments. Thus there are four strings of eight segments and four strings of seven segments. This construction results in leakage paths being set up in the liquid crystal material.

The top plate 12 is spaced parallel to the bottom plate 13 and sealed to the latter at its edges. A thin layer of liquid crystal material is contained between the plates. The plates 12 and 13, along with the liquid crystal material, form a liquid crystal electro-optical display. The term "liquiid crystal materials", as used herein, includes but is not restricted to those nematic liquid crystal compositions which are relatively transparent to light in a thin layer and which appear to become turbid upon the application of electric field above a threshold value, due to the scattering of light by domains of liquid crystal molecules (dynamic scattering). For example, suitable liquid crystal materials include p-n-orthoxybenzlidene-p'-aminobenzonitrile or p-ethoxy-benzlidene-p-n-butylaniline. The electro-optical liquid crystal display of the present invention may employ either dynamic scattering or field effect or other electro-optical effects. In the field effect, the orientation pattern of a suiable liquid crystal material is twisted and the twisted orientation rotates linearly polarized light.

Figure 3:
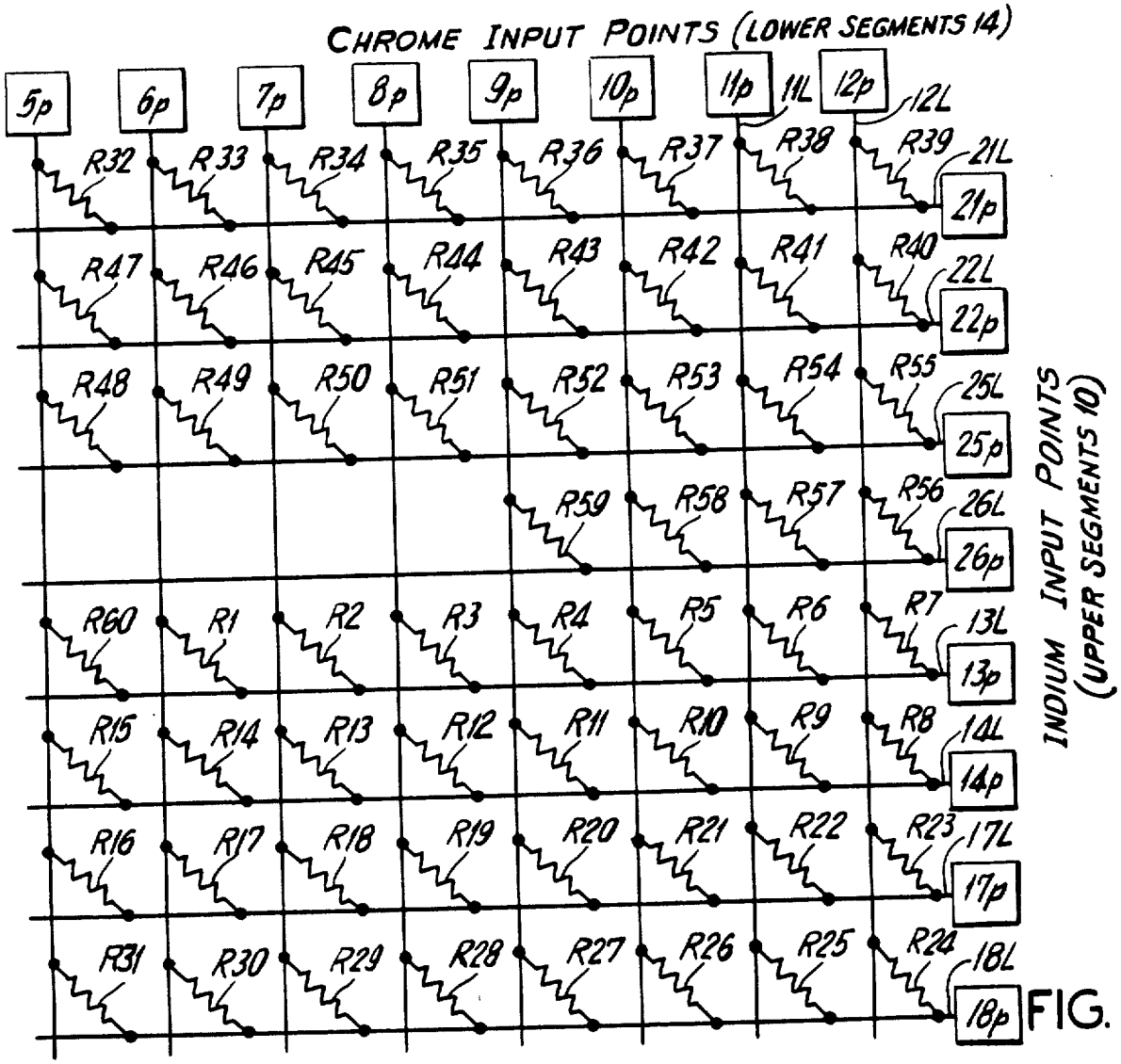
FIG. 3 is an equivalent circuit for the circuitry of the minute segments.

The experimental program which resulted in the present invention included the construction of a model of an equivalent circuit based upon the segment layout of FIG. 3. Using such investigatory techniques, it was determined that the leakage current to unactivated segments could be reduced to a level at which it would not activate said segments by utilizing a display drive circuit having one bias at one-third a full voltage and another at two-thirds of full voltage. It was found that if the leakage voltages, i.e., the voltages across the liquid crystal layer at the unactivated segments are kept at or below one-third of the voltage across the liquid crystal layer at the activated segments, then unwanted portions of the liquid crystal material will not be activated. This assumes, and the liquid crystal material is so selected, that one-third of the supply voltage is below the threshold voltage of the liquid crystal material.

FIG. 3 is an equivalent circuit showing an analysis of the leakage paths, without the divided voltages provided by the present invention. As shown in FIG. 3, the top boxes (5p - 12p) represent contacts, i.e., "pins", which are connected to the input leads to the respective strings of lower segments 14. The segments 14 represent the minutes or seconds on a watch face and are 60 in number on the bottom plate. There are eight segments 10 on the upper plate. Each segment 10 on the upper plate is aligned with a number of segments 14 on the bottom plate. There are consequently sixty tiny volumes of liquid crystal material which it is possible to activate. However, to represent the time indication for "minute" at any one instant only one volume of liquid crystal material should be activated and the other 59 volumes not activated.

The resistors of FIG. 3 are labeled R1 - R60 and each resistor R1 - R60 represents the resistance of the tiny volume of liquid crystal material positioned between two aligned segments. For example, resistor "R60" of FIG. 3 is at the top of the dial and is positioned between segment 10 (FIG. 1) on one plate and segment 60 (FIG. 2) on the other plate. Segment 60 is connected to a string which is connected with pin 5p. Segment 10 is connected to pin 13p. The volume of liquid crystal material between segment 10 and segment 60 has resistance denoted as the equivalent of resistor R60. Since the liquid crystal material is uniform, the equivalent resistors R1 - R60 have equal resistance.

In FIG. 3, the pins 21p, 22p, 25p, 26p, 13p, 14p, 17p and 18p correspond to the indium input points, i.e., inputs to the upper segments 10.

By way of explanation (FIG. 3), let it be desired that the common volume between the segments connected to pins 21p and 12p be activated. The resistance of this volume is represented by the resistor R39. It will be seen that the application of the voltage between pins 21p and 12p, i.e., applying voltage to the line 21 L and ground to 12 L, also supplies voltage to all the volumes with which the segment connected to line 21 L is in contact, namely, represented by R39, R38, R37, R36, R35, R34, R33, and R32. In addition, the voltage applied across the volume represented by R38 will cause certain amount of leakage current to flow into the line 11 L, which is connected to the pin 11p. That line 11L, in turn, applies a certain amount of leakage voltage to each of the volumes represented by the resistors R41, R54, R57, R6, R9, R22 and R25. To complete the circuit the resistors required to complete the loop back to the line 12 L are also included, these resistors being R40 in series with R41 and R55 in series with R54 and R56 in series with R57 and R7 in series with R6 and R8 in series with R9 and R23 in series with R22 and R24 in series with R25.

Figure 4:
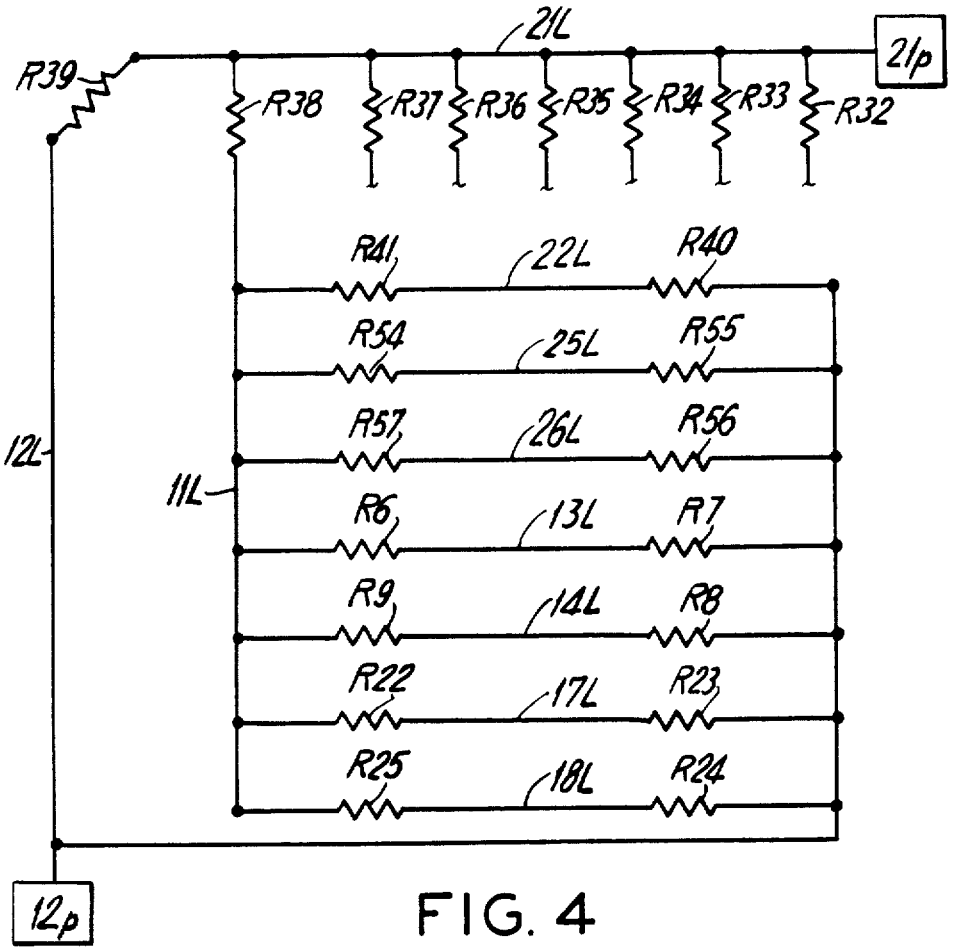
FIGS. 4–6 are simplified equivalent circuits of a portion of the circuit of FIG. 3.

As mentioned above, it is assumed, which is a reasonable assumption in view of the consistency of the resistance of the segments themselves and also the consistency of the resistance of the liquid crystal material, that the equivalent resistances between each of the segments is equal. Consequently, the further simplication of FIg. 4 results, in which the resistance of the segment desired to be activated, R39, is shown separate from those equivalent resistances which are involved in the leakage current. The resistance involved in the leakage current through R38 is in series with seven parallel paths of two resistors each. For example, in this first order approximation of the resistor matrix, one of the seven parallel paths would be through R41 and R40 in series as shown in FIG. 4. Each series pair of resistors is shown in FIG. 4 as a resistance of twice the value. Thus all seven parallel paths provide an equivalent resistance of two sevenths of one segments resistance, i.e. (2R/7)

Figure 5:
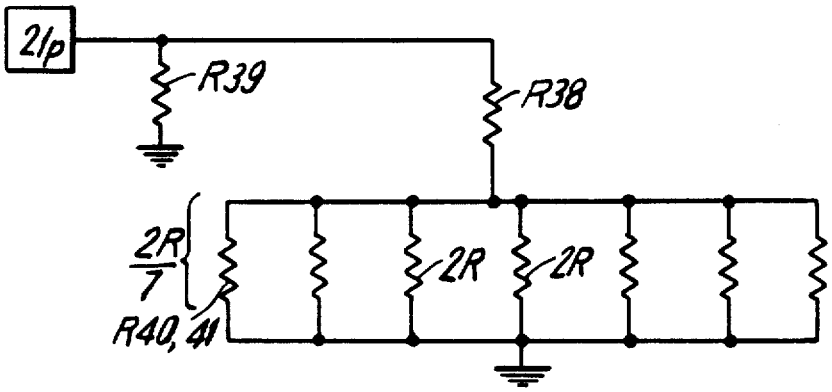
Figure 6:
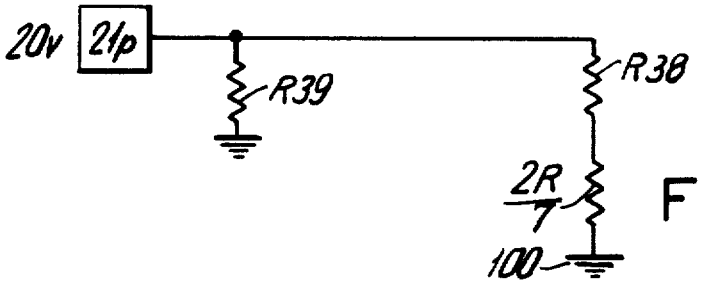

Simplifying again, as shown in FIG. 5, provides full driving voltage across the desired segment R39 (to activate its liquid crystal material between the plates) and also a driving voltage across an undesired segment (R38) in series with a parallel combination of segments. The driving voltage (V) divides across the series combination of resistors approximately as =

$$\frac{R}{R + \frac{2}{7} R} V = \frac{7}{9} V$$

Thus approximately three'quarters of the supply voltage is being developed across R38. This magnitude can cause segment R38 to activate when it is not desired to do so. This analysis, it should be noted, neglects the effects of other paths, which effects, however, are relatively minor. However, this analysis does illustrate the possibility of activating many unwanted segments.

Figure 7:
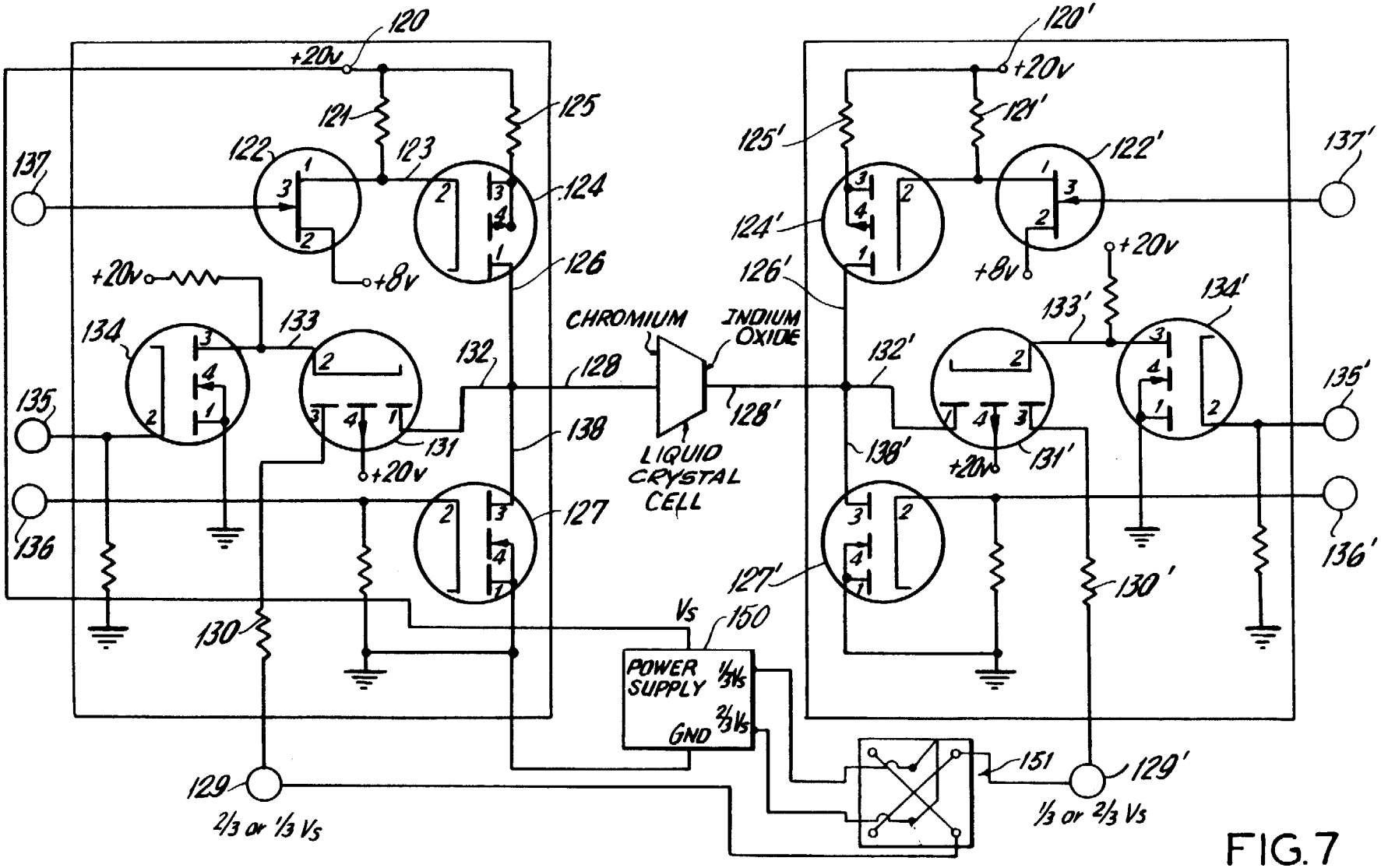
FIG. 7 is a schematic circuit diagram of the display driver circuit.

The voltages across the liquid crystal layer at the unwanted segments are forced to a definite value E by the circuit of FIG. 7 or equivalent. This is in contrast to the situation covered in the analysis, where such voltages were the result of a complex current distribution, with the horizontal and vertical input lines of FIG. 3 floating, except for the desired segments. The voltage E is selected as $V_1 = \frac{1}{3} V_s$, where $V_s$ is the supply voltage. The latter is the voltage seen by the desired activated segments. The threshold voltage $V_t$ of the liquid crystal material is chosen above $V_1 = (V_s/3)$ but should be less than $V_2 =$ [2 $V_s$3] 2Vs/3. It would be possible to choose $V_1 = \frac{1}{2} V_s$ but it should be noted that the brightness vs. voltage curve of the liquid crystal material does not have an abrupt knee, but exhibits a gradual sloping increase. Thus, a voltage of twice the threshold is usually needed to achieve full brightness. Selecting a ratio of $V_1 = \frac{1}{2} V_s$ would entail a very critical selection of the threshold voltage. If $V_t > V_1 = \frac{1}{2} V_s$, full brightness of $V_s$ may not be achieved; if $V_t < V_1 = \frac{1}{2} V_s$, unwanted segments may light up.

As shown in FIG. 7, the driver circuit uses solid state devices which may be individual devices or which may be formed as part of an integrated circuit chip. The circuit may also be constructed using COS/MOS logic. The circuit (FIG. 7) consists of a three way bridge arrangement of transistors whereby each liquid crystal volume between a conductive chromium segment (line 128) and an [idium] *indium* oxide segment opposite (line 126) can be subjected to any of three voltages of either polarity. Each of the two halves of the bridge circuit are mirror image circuits, each having three control inputs and three power supply connections. Control input 137 is connected to the gate (No. 3) input of J-FET transistor 122. When this input logic signal is high (greater than 8V) plus J-FET bias), the J-FET conducts, allowing a voltage drop across a resistor 121 (22 megohms) to turn the MOS FET transistor 124 to the "On" (conducting) state. This condition causes the positive supply voltage, in this case chosen for example at 20 volts, to be applied through the current limiting resistor 125 and MOS FET 124 to the chromium segment input to the liquid crystal cell via lines 126 and 128.

The second control input 136 is connected directly to the gate (No. 2) input of MOS FET transistor (N channel) 127. When this input logic signal is high then transistor 127 will conduct thus providing a direct path of ground for the chromium segment input to the liquid crystal cell via lines 138, 128.

The third control input 135 is connected to gate (No. 2) of MOS FET transistor (N-channel) 134. When this input logic signal is high then transistor 134 will conduct thus dropping the voltage on line 133 and causing gate (No. 2) of transistor 131 to be lowered below the 20 volt level and allow transistor 131 (P-channel) to become conducting. This provides a path for the $\frac{1}{3}$ or $\frac{2}{3}$ voltage level at input 129 to pass through limiting resistor 130, through transistor 131 to line 132 and thus be applied to line 128 and the chromium segment input to the liquid crystal cell.

The selection of $\frac{1}{3}$ or $\frac{2}{3}$ voltage for input 129 is provided by external logic and transmission COS/MOS bilateral switches. The power supply 150 and electronic reversing control 151 are coupled as in FIG. 7 to provide the necessary voltages.

Input control 135 is only activated if inputs 137 or 136 are not activated. When 135 is activated, the determination of which voltage ($\frac{1}{3}$ or $\frac{2}{3}$ voltage) is applied to power supply input 129 is logically dependent on the voltage applied to the [chronium] *chromium* side of the segment desired to be displayed. If full positive voltage is applied to the [chronium] *chromium* side of the segment desired to be activated, all other chromium segments not used will have input control 135 at a logic high and input bias voltage 129 set at $\frac{1}{3}$ voltage level. Conversely if the chromium segment desired is set to ground (indium side would be at full positive voltage in this case) then all other chromium segments thru bias supply input 129 would be set at $\frac{1}{3}$ voltage level.

As an example, the MOS field effect transistors 124 and 127 may be respectively types 2N4352 and 2N4351.

The circuit connected to the indium segments via lead 126' is the same as described above and its corresponding transistors, which are of the same type as those described above, are indicated by prime numbers. In this case the $\frac{1}{3}$ or $\frac{2}{3}$ voltage is to 129', the low control is 136', and the $\frac{1}{3}$ *and* $\frac{2}{3}$ control is to 135' and the high control is to 137'.

As a result of the power and control inputs to the left or right side of the bridge circuit, each side of a liquid crystal volume can thus be provided with any one of four voltage potentials. These are, full positive voltage $V_s$, $\frac{2}{3}$ positive voltage, $\frac{1}{3}$ positive voltage, or ground. The voltage across the liquid crystal can thus be of either polarity at three different voltage levels, full, $\frac{2}{3}$ and $\frac{1}{3}$ supply voltages.

The circuit of FIG. 7 will provide, on line 128', the $\frac{2}{3}$ (or $\frac{1}{3}$) voltage, in the magnitude of about +14 (or +7) volts, to the indium oxide segments not desired to be activated. Simultaneously it will provide the $\frac{1}{3}$ (or $\frac{2}{3}$) voltage, in the magnitude of about +7 (or +14) volts, to the chromium segments not desired to be activated. Consequently, there will be a voltage gradient between non-activated segments of $\frac{1}{3}$ of the supply voltage, i.e. 7 volts in the example. Those segments which it is desired to be activated will be provided with the full voltage difference, for example, of ground (zero) to the chromium segments and the voltage supply of +20 volts to the indium oxide segments. The driver circuit has, in this case, a four-level output, namely, $0\frac{1}{3}$, $\frac{2}{3}$ and $V_s$(supply voltage).

An alternative is to use a driver circuit providing a three-level output of zero, one half supply voltage and full supply voltage. For example, using a 20-volt supply, the one-half (10 volts) is applied to both the indium oxide segments and the chromium segment strings not desired to be activated. This will result in a maximum of one-half the supply voltage, i.e., 10 volts with $V_s$ at 20 volts, across some undesired segments. The liquid crystal material must consequently have an activation voltage greater than one-half the supply voltage.

What is claimed is:

1. An electro-optical display *for a timepiece* comprising:

a first and a second plate each having on one side thereof a pattern formed by segments, said segments being layers of conductive material, [at least some of said segments being electrically connected together;] *said second plate segment pattern comprising a plurality of radial segments and said first plate segment pattern comprising a plurality of common segments, each common segment being aligned with a predetermined number of said radial segments, each radial segment, aligned with one common segment, being electrically connected to only one radial segment from said number of radial segments aligned with another common segment,* said plates being spaced from each other and with the segments on each plate aligned; a thin layer of liquid crystal material sandwiched between said plates, said liquid crystal material characterized by a threshold voltage of $V_t$;

a driver circuit connected to said segments and a voltage source of $V_s$ connected to said driver circuit, said driver circuit having first voltage supply means *adapted* to provide [a] *to* first [selectable] segments of the first plate to voltage $V_1$ which is a fraction of $V_s$ and less than $V_2$, second voltage supply means *adapted* to provide to first [selectable] *predetermined* segments of said second plate [with] a voltage $V_2$ greater than $V_1$ and a fraction of $V_s$ wherein $V_1+V_2=V_s$ and $V_2>V_t>V_1$, third voltage supply means *adapted* to supply voltage $V_s$ [,] to second [selectable] *predetermined* segments of the first plate and fourth means *adapted* to switch second [selectable] *predetermined* segments of the second plate to zero voltage, whereby the liquid crystal material between the first segments is not activated and the liquid crystal material between the second segments is activated.

2. An electro-optical display as in claim 1 wherein said first plate and the segments thereon are transparent.

3. An electro-optical display as in claim 1 wherein [the] *both* said third [voltage supply means] and fourth voltage supply means *and both said first and second voltage supply means* rapidly [inter] change *in a predetermined relationship* to provide alternating [current] *voltages* to the segments on both plates.

4. An electro-optical display as in claim 1 wherein $V_1$ is about one-third of $V_s$ and $V_2$ is about two-thirds of $V_s$.

5. An electro-optical display *for a timepiece* comprising:

a first and second plate each having on one side thereof a pattern formed by segments, said segments being layers of conductive material, [at least some of said segments being electrically connected together;] *said second plate segment pattern comprising a plurality of radial segments and said first plate segment pattern comprising a plurality of common segments, each common segment being aligned with a predetermined number of said radial segments, each radial segment, aligned with one common segment, being electrically connected to only one radial segment from said number of radial segments aligned with another common segment,* said plates being spaced from each other and with the segments on each plate aligned; a thin layer of liquid crystal material sandwiched between said plates; said liquid crystal material characterized by threshold voltage of $V_t$;

a driver circuit connected to said segments and a voltage source of $V_s$ connected to said driver circuit, said driver circuit having first voltage supply means *adapted* to provide [a] *to* first [selectable] *predetermined* segments of the first plate a voltage $V_1$ which is a fraction of $V_s$ and less than $V_2$, second voltage supply means *adapted* to supply voltage $V_s$ to second [selectable] *predetermined* segments of the first plate [voltage $V_s$], and third means *adapted* to switch second [selectable] *predetermined* segments of the second plate to zero voltage, whereby the liquid crystal material between the first segments is not activated and the liquid crystal material between the second segments is activated.

6. An electro-optical display as in claim 5 wherein said first plate and the segments thereon are transparent.

7. An electro-optical display as in claim 5 wherein the said second and third means rapidly interchange to provide alternating current to the segments on both plates.

8. An electro-optical display as in claim 5 wherein $V_1$ is about one-half of $V_s$.

9. In a wrist watch, the combination comprising:

an electrical optical display comprising first and second plates parallel to each other, each having on the facing sides thereof a pattern formed of segments, said segments being layers of a conductive material, said first plate having a multiplicity of relatively large segments and a plurality of terminals, each plate being connected to a terminal, said second plate having a multiplicity of smaller *radial* segments arranged in groups, one group each facing one segment of said first plate, [corresponding segements in each of said groups being electrically connected together and to a terminal thereby forming a matrix of elements] *each radial segment in one group electrically connected to only one radial segment in another group*, a thin layer of liquid crystal material of threshold voltage $V_t$ sealed between said plates, driver circuit means connected to said segments and to a voltage source $V_s$, said driver circuits having first voltage supply means *adapted* to selectively provide voltage $V_s$ or zero to one desired selectable segment of said first plate, second voltage supply means *adapted* to supply alternately zero voltage or $V_s$ to desired selectable electrically connected together [corresponding] segments on said second plate, third voltage supply means *adapted* to supply [aternately $V_s$13] *Vs/3* to all other segments of said first plate and fourth voltage supply means *adapted* to supply alternatively 2V/3 to all other segments of said second plate *in predetermined relationship with alternately supplied zero voltage and Vs* thereby ensuring that the maximum voltage between any undesired segments of first and second plates is $V_s/3 < V_t$.

10. A wrist watch in accordance with claim 9 wherein:

the segment pattern on the first and second plates each comprise a series of radial segments circularly arranged about a common center to provide an analog watch display.

11. A wrist watch in accordance with claim 10 wherein:

24 segments are provided in an inner ring to indicate half hours and 60 segments are provided on an outer ring to indicate minutes on one of said plates, wherein said 24 half-hour segments are arranged in a suitable matrix arrangement and said minute segments are arranged in an 8×8 matrix with four unused matrix positions.

* * * * *